United States Patent [19]

Cummings

[11] Patent Number: 5,758,844
[45] Date of Patent: Jun. 2, 1998

[54] VERTICAL/SHORT TAKE-OFF AND LANDING (V/STOL) AIR VEHICLE CAPABLE OF PROVIDING HIGH SPEED HORIZONTAL FLIGHT

[75] Inventor: Darold B. Cummings, Hawthorne, Calif.

[73] Assignee: Boeing North American, Inc., Seal Beach, Calif.

[21] Appl. No.: 654,133

[22] Filed: May 28, 1996

[51] Int. Cl.$^6$ ................. B64C 11/00; B64C 3/38
[52] U.S. Cl. ................. 244/7 C; 244/12.4; 244/48; 244/56; 244/66
[58] Field of Search .............. 244/7 C, 12.1, 244/12.4, 48, 52, 56, 66

[56] References Cited

U.S. PATENT DOCUMENTS

| | | | |
|---|---|---|---|
| 2,961,188 | 11/1960 | Taylor | 244/12.4 |
| 2,988,301 | 6/1961 | Fletcher . | |
| 3,029,043 | 1/1962 | Churchill | 244/7 C |
| 3,049,320 | 8/1962 | Fletcher | 244/12.4 |
| 3,128,829 | 4/1964 | Young . | |
| 3,197,157 | 7/1965 | King | 244/7 C |
| 3,329,376 | 7/1967 | Sullivan | 244/12.4 |
| 3,488,018 | 1/1970 | Johnson | 244/12.4 |
| 3,666,209 | 5/1972 | Taylor | 244/7 C |
| 3,966,142 | 6/1976 | Corbett et al. | 244/12.4 |
| 4,085,911 | 4/1978 | Nahodyl | 244/12.4 |
| 4,613,097 | 9/1986 | Jordan | 244/12.4 |
| 4,828,203 | 5/1989 | Clifton et al. . | |
| 4,898,343 | 2/1990 | Kamo | 244/12.4 |
| 4,928,907 | 5/1990 | Zuck | 244/7 C X |
| 5,145,129 | 9/1992 | Gebhard | 244/12.4 X |
| 5,242,132 | 9/1993 | Wukowitz | 244/12.4 X |
| 5,295,643 | 3/1994 | Ebbert et al. . | |
| 5,372,337 | 12/1994 | Kress et al. | 244/52 |
| 5,405,105 | 4/1995 | Kress | 244/7 C |
| 5,419,513 | 5/1995 | Flemming, Jr. et al. . | |

*Primary Examiner*—William Grant
*Attorney, Agent, or Firm*—Lawrence N. Ginsberg; Charles T. Silberberg

[57] ABSTRACT

The vehicle includes a fuselage; a plurality of lifting surfaces attached to the fuselage having control devices attached thereto; and, an articulated propulsion system attached to the fuselage. The propulsion system includes a duct assembly pivotally connected to the fuselage. The duct assembly includes a duct and a propeller assembly mounted within the duct. A motor assembly is connected to the propeller assembly. The duct assembly may be positioned in a substantially vertical position to provide sufficient direct vertical thrust for vertical take-off and landing and may be directed in other positions to provide a varying spectrum of take-off and landing configurations, as well as a substantially horizontal position for high speed horizontal flight. Use of the control surface in the ducted propulsion assembly provides VTOL capability in a very small environment. The environment is not required to be prepared in any special manner. During horizontal flight, the wings provide the lift, which is more efficient than a propeller providing lift. The present invention takes advantage of a center line propulsion, so that there are no asymmetric propulsion loads.

7 Claims, 5 Drawing Sheets

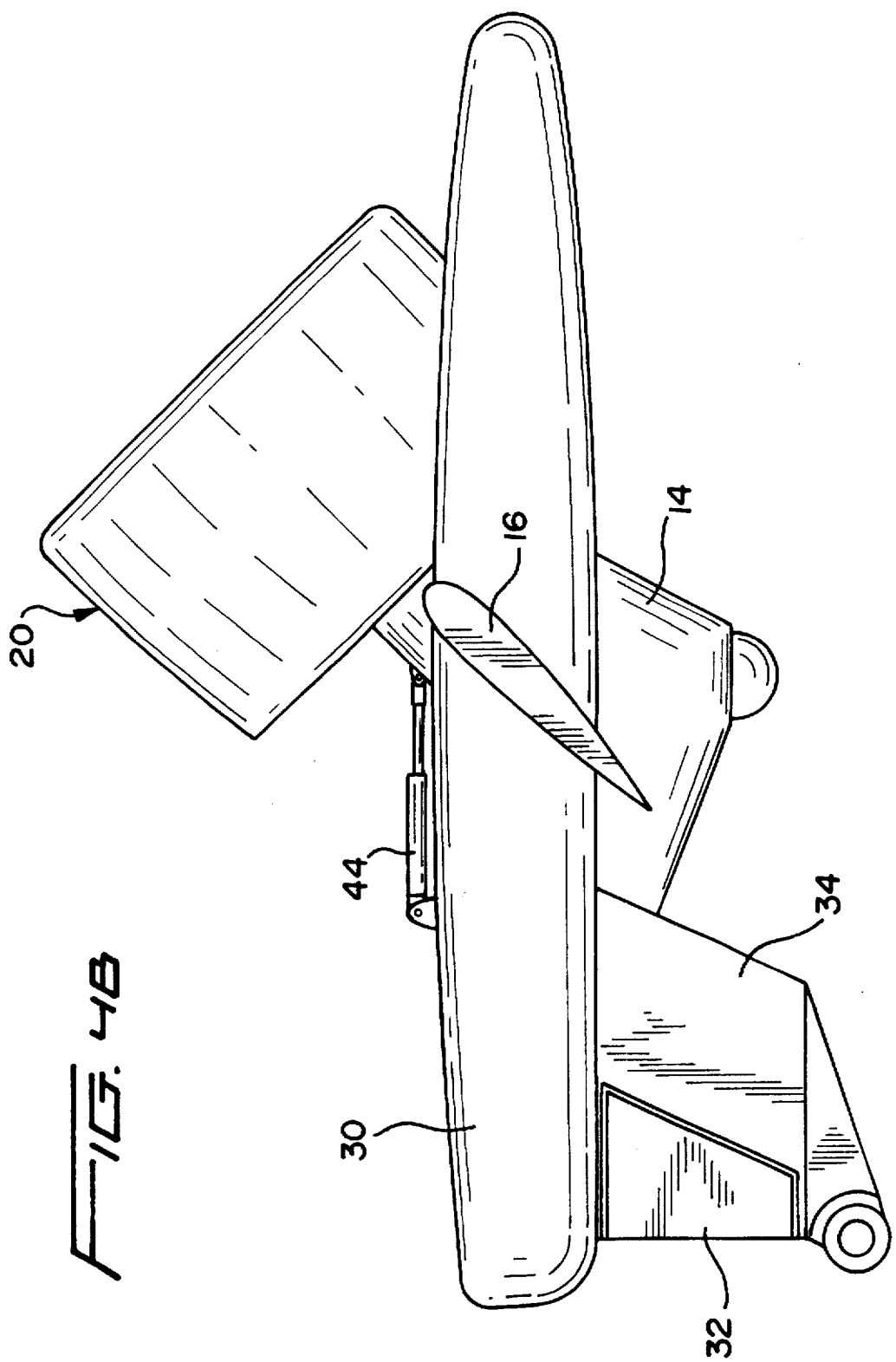

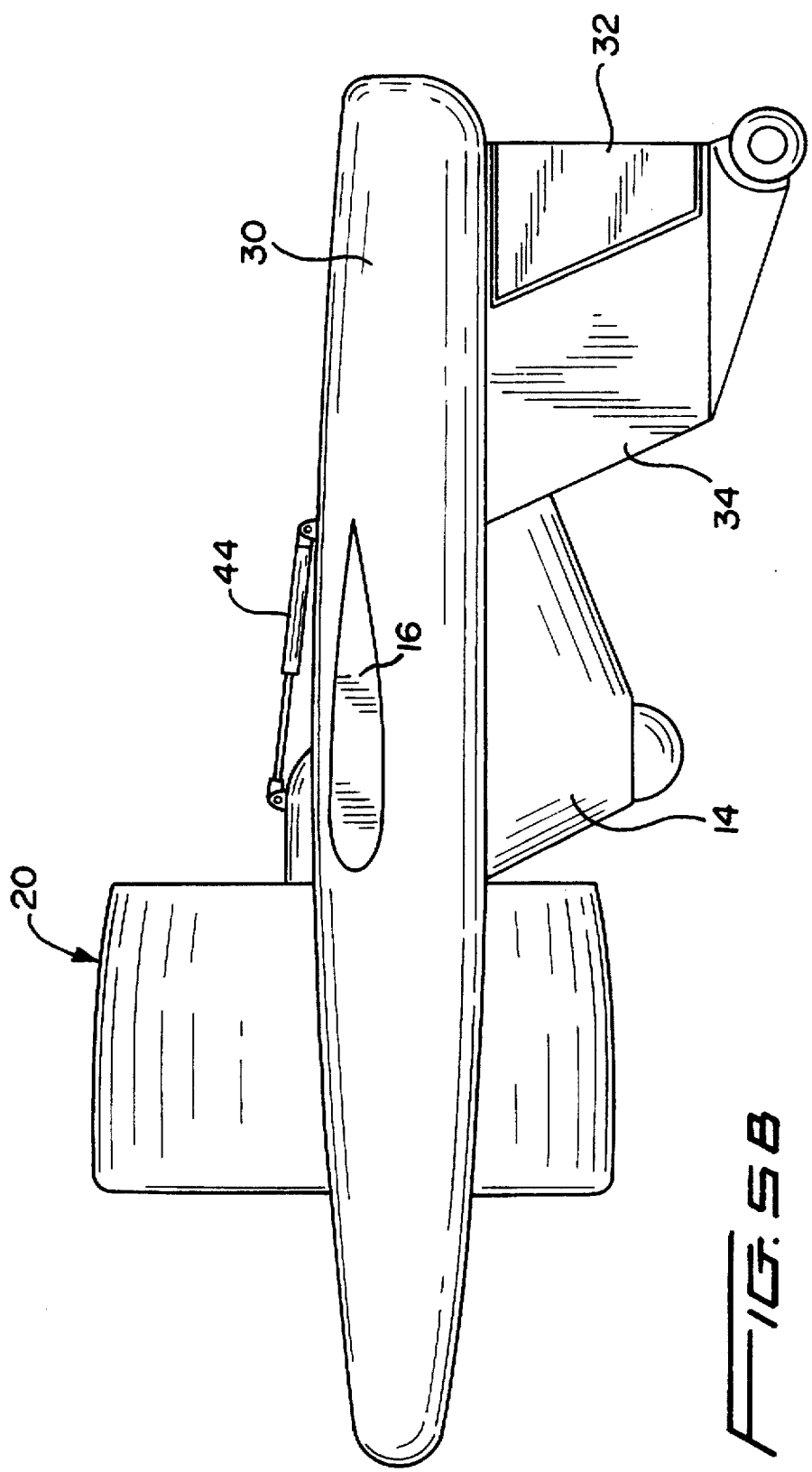

5,758,844

VERTICAL/SHORT TAKE-OFF AND LANDING (V/STOL) AIR VEHICLE CAPABLE OF PROVIDING HIGH SPEED HORIZONTAL FLIGHT

BACKGROUND OF THE INVENTION

1. Field of the Invention

The present invention relates to Vertical/Short Take-Off and Landing (V/STOL) air vehicles, and more particularly to the use of an articulated ducted fan propulsion system for providing VTOL and high-speed horizontal flight.

2. Description of the Related Art

V/STOL flight has been accomplished by helicopters, multi-engined tilt-rotor, tilt thrust, and tilt-wing aircraft. Helicopters require complex mechanisms for stability and control, and are inefficient in horizontal flight. Launch and recovery of small helicopters in confined areas is dangerous due to the exposed rotating blades. The V-22 is an example of a current generation tilt-rotor aircraft. This aircraft has similar problems to its predecessors, i.e., downwash from the rotor blades is blocked by the wing in its fixed horizontal position, therefore spoiling lift; the twin rotors spaced a large distance from the fuselage are subject to asymmetric lift loadings, causing control problems; and the large rotors prevent the aircraft from landing in a conventional horizontal mode in an emergency. The AV-8 is a well-known tilt-thrust aircraft. The high propulsive energy required for vertical take-off of the AV-8 uses a high proportion of the fuel, and the range is very limited. Use of this type propulsion system for long-range air vehicles has proved to be impractical. The most well known tilt-wing aircraft is the Canadair CL-99, developed in the 1960's. Problems with stability and control, and high cost compared to other systems kept this aircraft from going into production. U.S. Pat. No. 5,405,105, issued on Apr. 11, 1995, discloses a tilt-wing aircraft which addresses a flap concept for horizontal motion, while the aircraft is in the hover mode. It does not address the intrinsic problems associated with multi-engined tilt-winged aircraft, i.e., asymmetric lift loadings causing stability and control problems, and the complexity of the tilting control/propulsion mechanism.

V/STOL flight has also been demonstrated in "flying duct" aircraft. Propeller ducting increases the efficiency of the propulsion unit, while increasing operator safety by shrouding the blades. Stators and vanes straighten the air flow in the duct, thereby decreasing torque effects. A ducted propeller propulsion unit, combined with vanes for stability and control, can be used as a complete flying air vehicle. This concept has been disclosed in U.S. Pat. No. 5,295,643. Similar flying duct designs have been produced in the past, and in fact, model airplane engines have been mounted in large tin cans with the top and bottom removed and flown on a tethered line to demonstrate this concept in the 1950's. This concept works well for vertical lift, however, for horizontal flight lift can only be generated by a thrust vector or the duct, which becomes a circular airfoil in near-level flight, and is very inefficient. Because of this, these types of air vehicles are normally only flown very short distances, or are tethered and used for observation platforms.

SUMMARY OF THE INVENTION

The present invention is a Vertical/Short Take-Off and Landing air vehicle capable of providing high speed horizontal flight. In its broad aspects, it comprises a fuselage; a plurality of lifting surfaces attached to the fuselage having control devices attached thereto; and, an articulated propulsion system attached to the fuselage. The propulsion system includes a duct assembly pivotally connected to the fuselage. The duct assembly includes a duct and a propeller assembly mounted within the duct. A motor assembly is connected to the propeller assembly. The duct assembly may be positioned in a substantially vertical position to provide sufficient direct vertical thrust for vertical take-off and landing and may be directed in other positions to provide a varying spectrum of take-off and landing configurations, as well as a substantially horizontal position for high speed horizontal flight. Use of the control surface in the ducted propulsion assembly provides VTOL capability in a very small environment. The environment is not required to be prepared in any special manner. During horizontal flight, the wings provide the lift, which is more efficient than a propeller providing lift. The present invention takes advantage of a center line propulsion, so that there are no asymmetric propulsion loads.

DETAILED DESCRIPTION OF THE PREFERRED EMBODIMENT

Figure 1:
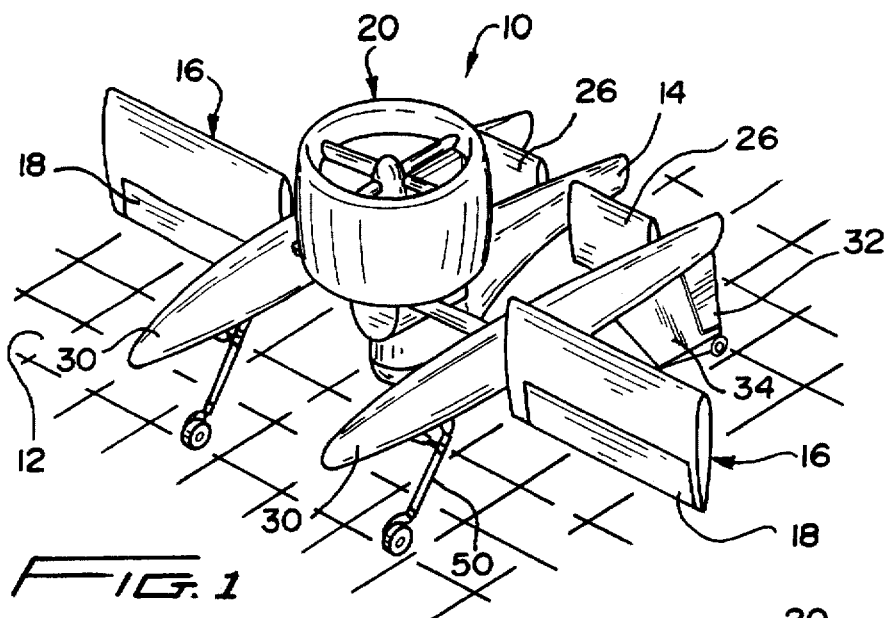

Referring now to the drawings and the characters of reference marked thereon, FIG. 1 illustrates a perspective view of the Vertical/Short Take-Off and Landing air vehicle (V/STOL) of the present invention, designated generally as 10, shown on a horizontal ground surface 12. V/STOL 10 includes a fuselage 14 and a plurality of lifting surfaces 16 attached to the fuselage 14. The lifting surfaces 16 include control devices 18 attached thereto. An articulated propulsion system 20 is attached to the fuselage 14.

Figure 2:
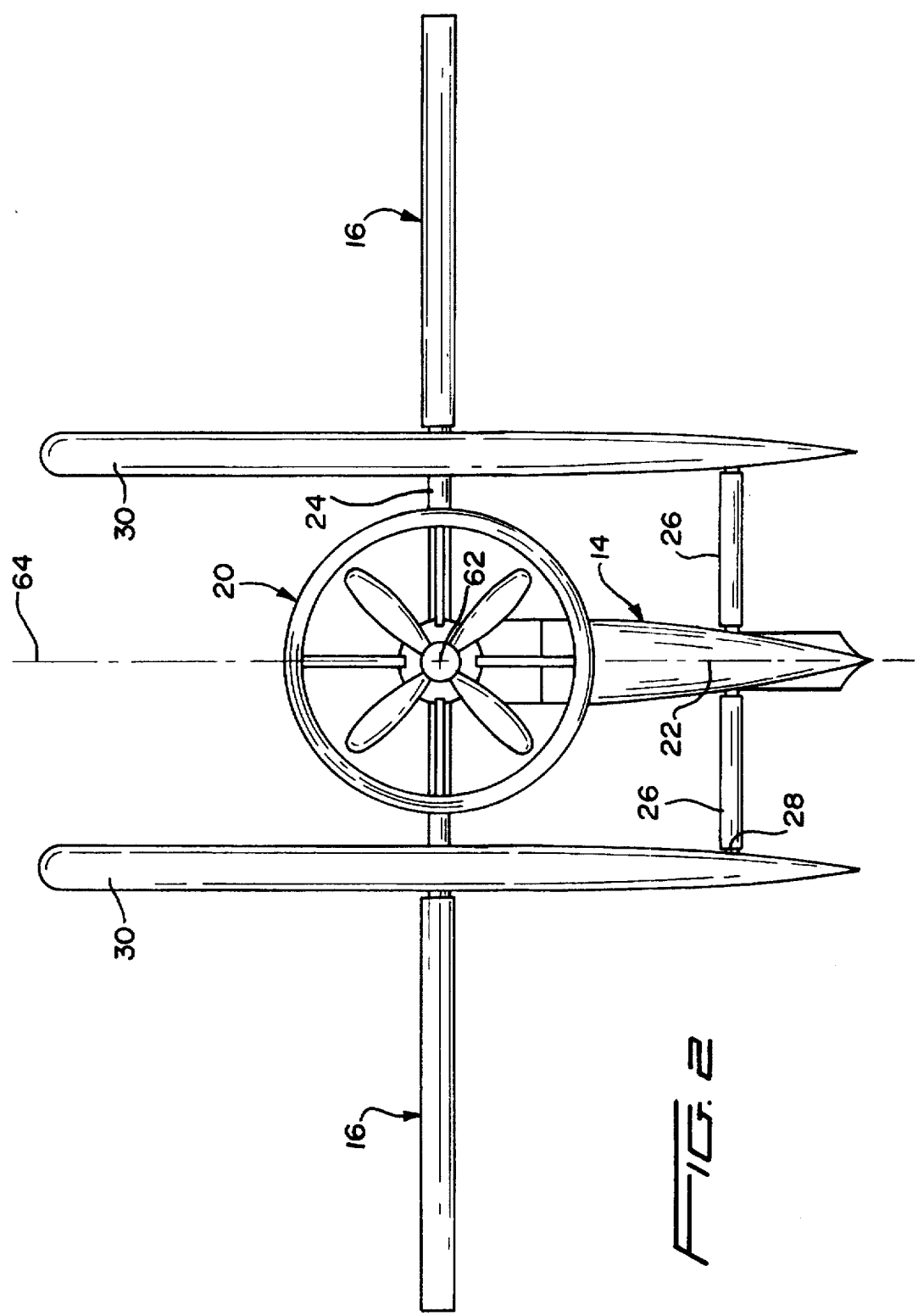

Referring now to FIG. 2, a top view of the V/STOL 10 is illustrated in the vertical take-off and landing mode of FIG. 1. The fuselage 14 serves as a central locating device for the propulsion system 20 and the lifting surfaces 16. The fuselage 14 is generally elongated and includes a central axis 22. It may be formed of a composite shell, aluminum or other suitable aircraft structural material. It generally contains flight control system actuators, avionics and electronics and subsystems such as cooling systems, hydraulics, and electrical distribution systems.

The wings or lifting surfaces 16 are connected to the fuselage via a rotating shaft 24, by methods well understood by those skilled in art. All moving horizontal tails 26 are connected to the fuselage 14 by a shaft 28.

A pair of symmetrically positioned longitudinal booms 30 are each positioned on a respective side of the fuselage 14. The booms 30 are formed of similar suitable aircraft structures as the fuselage 14. The booms 30 are aerodynamically shaped to provide directional stability. They typically contain fuel storage tanks. They also provide space to store landing gear when the landing gear is in the retracted position.

Figure 3:
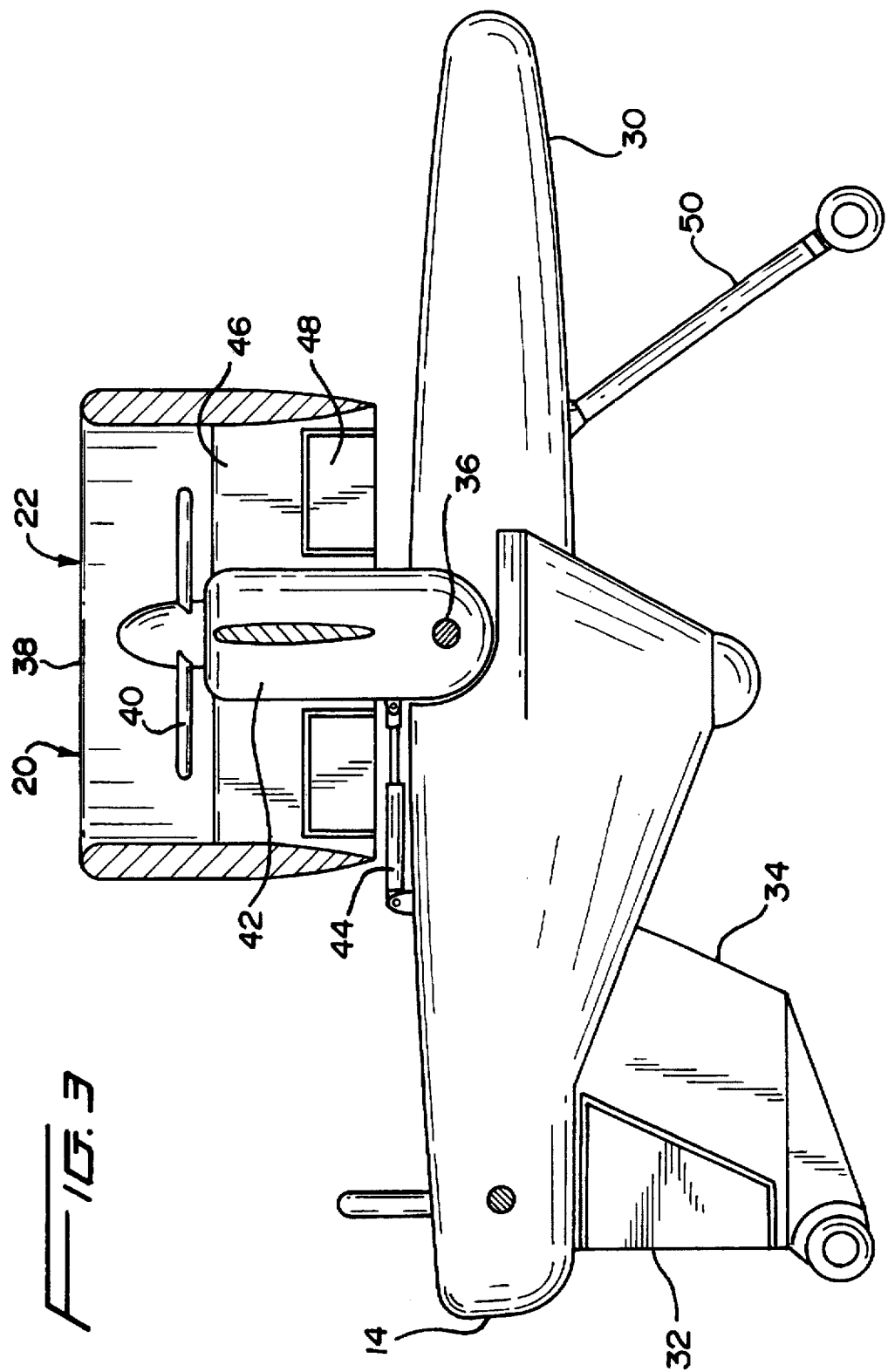

Referring now to FIG. 3, it can be seen that each boom 30 includes a rudder 32 and a vertical stabilizer 34 connected thereto which serves as a directional control surface.

Still referring now to FIG. 3, the articulated propulsion system 20 can be observed cutaway. The articulated propulsion system 20 comprises a duct assembly 22 pivotally connected to the fuselage 14, as shown at pivot point 36. The duct assembly 22 includes a duct 38 and a propeller assembly 40 mounted within the duct 38. The articulated propulsion system 20 includes a motor assembly 42 connected to the propeller assembly 40. The duct assembly 22, is pivotally connected to the fuselage 14 via a shaft and housing and suitable bearings. It articulates through a 90° angle via a hydraulic actuator 44. Such pivotable actuation means are well known to those skilled in the art and are in aircraft such as the F-8, Canadair CL-99 and the V-22.

The duct 38 comprises a hollow cylindrical housing. A plurality of fixed vanes 46 are each attached at an outer end thereof to the housing. An inner end of each vane is attached to the motor assembly 42. A plurality of guide vanes 48 are attached to downstream portions of the fixed vanes 46 for controlling the vehicle in a substantially vertical flight mode. The duct assembly 22 is preferably formed of aluminum.

Figure 4A:
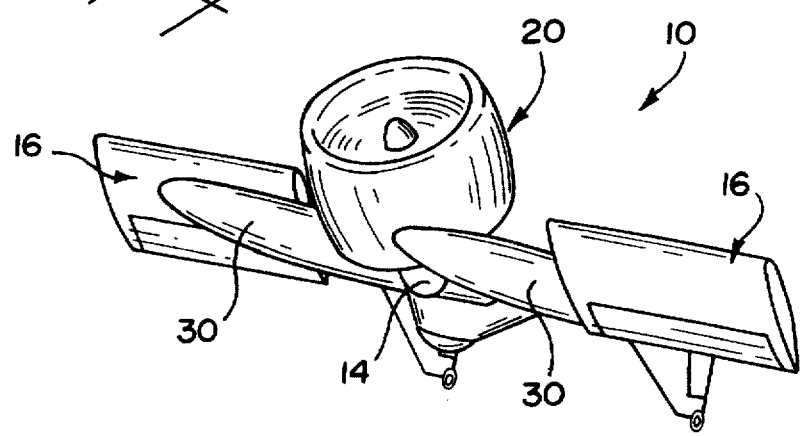

During operation, during take-off, the articulated propulsion 20 is oriented, as shown in FIG. 1. Nose gears 50 are extended. There is 'power on' and systems checked. There is increased throttle. As can be seen in FIGS. 4A and 4B, the fuselage 14 and booms 30 rotate until the center of gravity aligns with the vertical thrust. The nose gears 50 retract. The guide vanes 48 control hover and take-off flight.

Figure 5A:
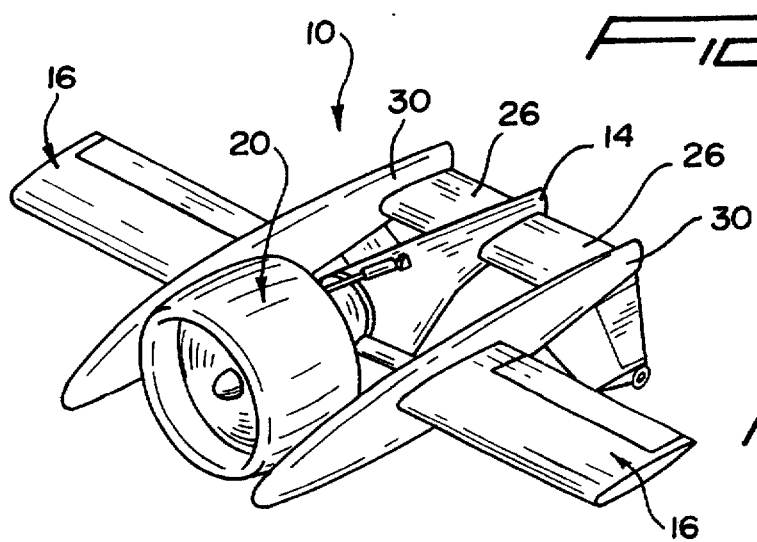

Referring now to FIGS. 5A and 5B, during horizontal flight, the fuselage 14 and booms 30 are pivoted (using actuator 44) in relationship to the articulated propulsion system 20 to form an "aircraft" configuration (i.e., an end quote was added after aircraft). The central axes of the fuselage and duct assembly (numeral designations 22 and 62, respectively) are aligned with an imaginary longitudinal center line 64 of the air vehicle 10.

As can be seen in the drawing figures, each of the wings 16 and all moving tails 26 pivots with respect to the fuselage to remain generally aligned with a central axis of the duct assembly 22 as the propulsion system 20 is oriented in and between a substantially vertical take-off position and a substantially horizontal high speed horizontal flight position.

Use of a ducted propulsion system improves the efficiency of the propulsion system and shrouds the propeller to prevent accidents to maintenance personnel, operators and protects against damage to equipment, property.

Use of a control ducted propulsion assembly provides VTOL capability in a very small environment, which is not required to be prepared in any special manner. The air blowing down from the propeller is neither hot nor damaging in any way to the surface on which the vehicle rests. This ducted propulsion system provides vertical take-off capabilities. During horizontal flight, the wings provide the lift (which is much more efficient than a propeller providing lift). The ducted propulsion system is turned into the direction of flight and is used efficiently as the propulsion unit (as opposed to the lifting means).

The present invention takes advantage of a center line propulsion (so that there are no asymmetric propulsion loads).

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A vertical/short take-off and landing air vehicle capable of producing high speed horizontal flight, comprising:
    a) a fuselage;
    b) a plurality of lifting surfaces, including at least one wing and at least one all moving horizontal tail, attached to said fuselage, each said at least one wing having a respective control device attached thereto;
    c) an articulated propulsion system attached to said fuselage, comprising:
        i) a duct assembly pivotally connected to said fuselage, said duct assembly comprising:
            a duct; and
            a propeller assembly mounted within said duct; and
        ii) a motor assembly connected to said propeller assembly,
    wherein said propulsion system is positionable in a substantially vertical position to provide sufficient direct vertical thrust for vertical take-off and landing and is directable to other positions to provide a varying spectrum of take-off and landing configurations as well as a substantially horizontal position for high speed horizontal flight and wherein each of said plurality of lifting surfaces pivots with respect to the fuselage to remain generally aligned with a longitudinal central axis of the duct assembly as the propulsion system is positioned in and between the substantially vertical position and the substantially horizontal position.

2. The air vehicle of claim 1, wherein said air vehicle defines a longitudinal center line and said fuselage has a longitudinal central axis,
    wherein during substantially horizontal flight, said longitudinal central axes of said fuselage and said duct assembly are collinear with said longitudinal center line of said air vehicle; and
    wherein during substantially vertical flight, said duct assembly is rotatable to a position such that said longitudinal central axis of the duct assembly is substantially perpendicular to said longitudinal central axis of said fuselage and said longitudinal center line of said air vehicle.

3. The air vehicle of claim 1, wherein said duct, comprises:
    a hollow cylindrical housing;
    a plurality of fixed vanes, each vane being attached on an outer end to said housing and at an inner end to said motor assembly; and
    a plurality of guide vanes attached to downstream portions of said fixed vanes for controlling said vehicle in a substantially vertical flight mode.

4. The air vehicle of claim 1, further comprising:
    a pair of symmetrically positioned longitudinal booms, each boom being positioned on a respective side of said fuselage, said plurality of lifting surfaces being attached to said booms;
    a plurality of directional control surfaces connected to said booms; and
    landing gear extending from said booms.

5. The air vehicle of claim 1, further comprising:
    a hydraulic actuator extending between said fuselage and said duct assembly, for positioning said propulsion system in and between the substantially vertical position and the substantially horizontal position.

6. The air vehicle of claim 1, further comprising:
    a pair of longitudinal booms, said booms being positioned laterally outward from and on opposite sides of said fuselage;
    each of said plurality of lifting surfaces being attached to at least one of said booms by a respective rotating shaft;
    a pair of directional control surfaces each being connected to a respective one of said booms, and each directional control surface including a rudder and a vertical stabilizer.

7. The air vehicle of claim 6, further comprising:
    a pair of retractable nose gear each extending from a respective one of said booms.

* * * * *